United States Patent [19]
Shimonou

[11] Patent Number: 5,293,364
[45] Date of Patent: Mar. 8, 1994

[54] TRACK ACCESS CONTROL DEVICE FOR AN OPTICAL DISK DRIVE

[75] Inventor: Shigeru Shimonou, Tokyo, Japan

[73] Assignee: NEC Corporation, Tokyo, Japan

[21] Appl. No.: 988,824

[22] Filed: Dec. 10, 1992

[30] Foreign Application Priority Data

Dec. 10, 1991 [JP] Japan ................................. 3-350843

[51] Int. Cl.$^5$ ............................................ G11B 7/095
[52] U.S. Cl. .......................... 369/44.25; 369/44.28; 369/44.29; 369/44.32; 369/54
[58] Field of Search ......... 369/32, 44.25, 44.28–44.29, 369/44.32, 44.34–44.36, 54

[56] References Cited

U.S. PATENT DOCUMENTS 4,562,562 12/1985 Moriya et al. ............... 369/44.28 X
5,117,410 5/1992 Akiyama ..................... 369/44.28 X
5,199,012 3/1993 Imai ............................ 369/44.28 X Primary Examiner—W. R. Young
Attorney, Agent, or Firm—Sughrue, Mion, Zinn, Macpeak & Seas

[57] ABSTRACT

A stable and rapid track access control device capable of preventing, in the event of driving a converging lens of an optical disk drive to move a light beam, the lens from moving excessively. Assume that when the lens is driven to move the light beam, the movement of the lens exceeds a range which an optical lens can follow, increasing the positional deviation of the lens relative to the head. Then, the movement of the lens is so regulated as to equalize the speed of the lens and that of the head relative to each other.

2 Claims, 2 Drawing Sheets

TRACK ACCESS CONTROL DEVICE FOR AN OPTICAL DISK DRIVE

BACKGROUND OF THE INVENTION

The present invention relates to an optical disk drive for recording and reproducing data optically and, more particularly, to a track access control device applicable to an optical disk drive for moving a light beam over the consecutive tracks of a disk to a desired track and positioning it at the desired track.

With an optical disk drive for writing or reading data optically in or out of a medium or disk, it is necessary to move an optical head, i.e., a beam issuing from the head to desired one of a number of tracks formed on the medium in concentric circles or in a spiral and position it at the desired track. Since the head traverses a plurality of tracks intervening between it and the desired tack or target track, it is a common practice to control the movement of the beam by counting the tracks which the beam traverses. Specifically, the number of tracks which the beam traversed is subtracted from the distance (number of tracks) to the target track to generate a position signal. The beam is moved in a direction for reducing the position signal up to the target track. While the beam is in movement, a reference speed signal is generated which changes with a change in the distance to the target track. The moving speed of the beam is so controlled as to conform to the reference speed signal and thereby moved at high speed.

The above-described type of control is commonly effected not only with an optical disk drive but also with a magnetic disk drive. However, regarding an optical disk drive, the beam cannot be accurately stopped at the target track unless the speed control is provided with a high control frequency band (control loop gain) since the width of a track of an optical disk is far narrower than that of a magnetic disk.

The problem with a system of the type directly driving the head which is heavy is that it is difficult to set a high control frequency band, preventing the beam from being stopped at the target track stably and accurately. To eliminates this problem, a system which moves the beam by driving a lens adapted to converge the beam has been proposed, as disclosed in, for example, Japanese Patent Laid-Open Publication No. 131646/1985. In this kind of system, the lens has its speed controlled by the reference speed signal, i.e., the head is driven to follow the movement of the lens on the basis of a signal representative of a deviation of the lens from the head. Moving the small and light lens in place of the heavy head is successful in promoting speed control having sharp response and high control frequency band. However, the response of the mechanism for driving the head is too slow to sufficiently follow the rapid movement of the lens, increasing the positional deviation of the lens and head. The increase in the deviation of the lens and head means a noticeable deviation of the center of the lens from the axis of the beam to be converged and, therefore, critically aggravates the converging ability of the lens. Moreover, the deviation of the lens causes an track error signal representative of a deviation of the beam from the track to become offset and decrease in level. As a result, the control over the position of the beam and the speed control both of which are based on the track error signal are not stable.

In the light of the above, Japanese Patent Application No. 280769/1988 teaches an implementation for limiting a variation of the reference speed signal, which provides the moving speed of the lens, with respect to time (corresponding to an acceleration of the lens). This approach, however, complicates the circuit arrangement and, since the acceleration is limited, delays the arrival of the beam at the target track.

SUMMARY OF THE INVENTION

It is, therefore, an object of the present invention to provide a track access control device for an optical disk capable of promoting a rapid and stable track access procedure.

In accordance with the present invention, in an optical disk drive comprising a converging lens, an optical head for issuing a laser beam toward a medium via the converging lens to write or read data in or out of the medium, a lens driving circuit for generating a lens drive signal which moves the converging lens in the radial direction of the medium, a lens actuator responsive to the lens drive signal for moving the converging lens, a lens position detector for generating a lens position signal representative of a position of the converging lens relative to the optical head, and a head driver responsive to the lens position signal for causing the optical head to follow the movement of the converging lens in such a manner as to reduce the positional deviation of the converging lens, a track access control device comprises a signal level comparing circuit for comparing the level of the lens position signal with a predetermined reference level to produce a comparison signal, a differentiating circuit for differentiating the lens position signal to produce a differentiation signal, and a signal selecting circuit responsive to the comparison signal for feeding, when the positional diviation of the converging lens exceeds a predetermined range, the differentiation signal to the lens actuator in place of the lens drive signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
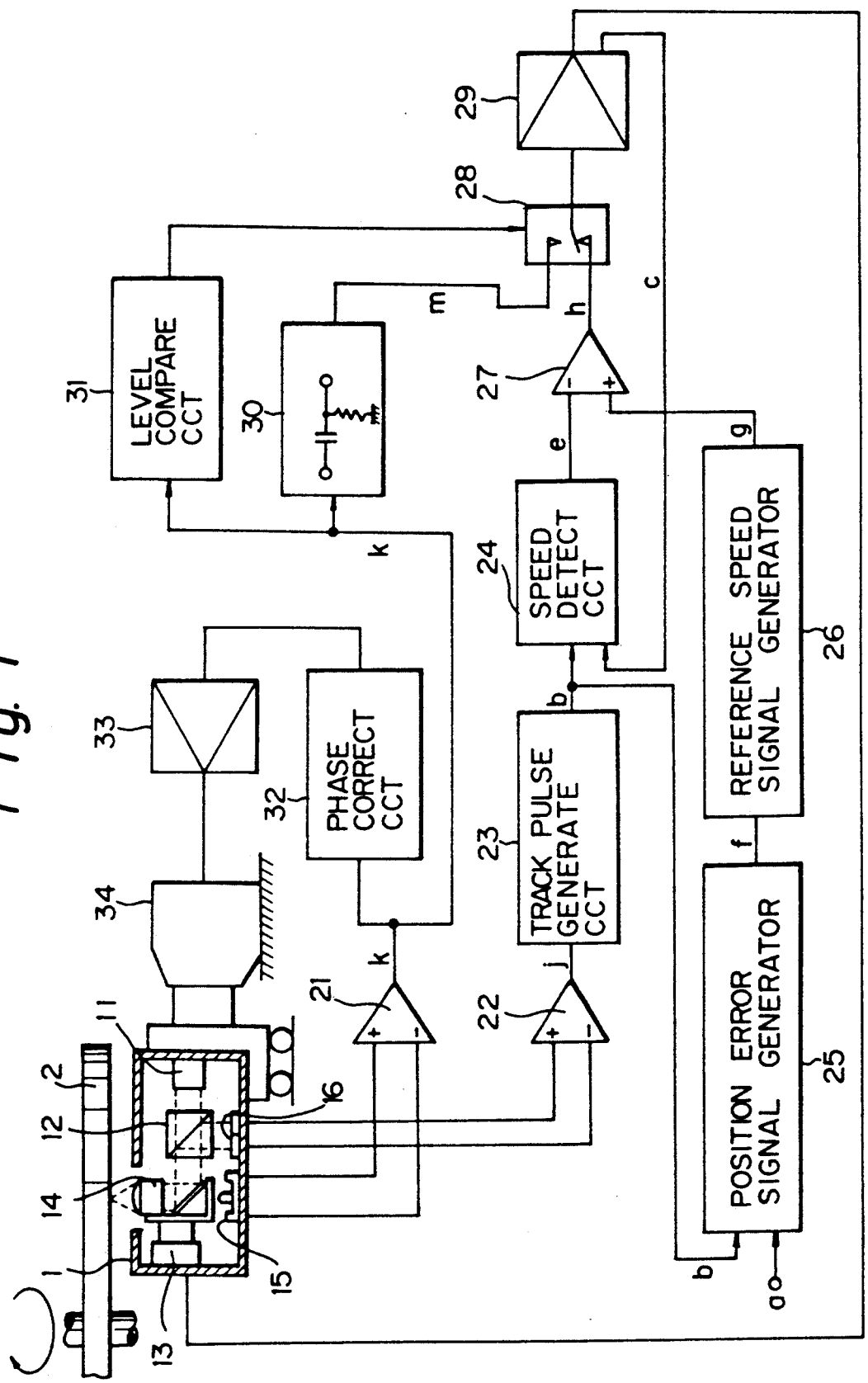
FIG. 1 is a block diagram schematically showing a track access control device embodying the present invention.

Referring to FIG. 1 of the drawings, a track access control device embodying the present invention is shown and includes an optical head 1. A laser 11, a beam splitter 12, a lens actuator 13, a converging lens 14, a lense position detector 15 and a track error detector 16 are built in the head 1. A laser beam issuing from the laser 11 is converged by the lens 14 and then incident on the recording surface of a medium or disk 2 to write or read data in or out of the medium 2. A great number of tracks are formed on the recording surface of the medium 2 in concentric circles or in a spiral which can be optically sensed. A reflection from the medium 2 is returned to the head 1 via the lens 14. The beam splitter 12 separates part of the reflection and steers it to the track error detector 16. Implemented as a bisected photodetector, for example, the track error detector 16 generates a current, or optical current, which changes with a change in the reflection. Specifically, the reflection incident on the head 1 deviates, inclines or otherwise changes due to the deviation of the beam from the track of the medium 2.

The lens 14 is mounted on the lens actuator 13 and movable in the radial direction of the medium 2. The lens position detector 15 detects such a movement of the lens 14. In the illustrative embodiment, the lens position detector 15 is implemented as a reflection type position sensor having a light emitting diode (LED) at the center and photodiodes at opposite sides of the LED. The head 1 is mounted on a head actuator 34 and bodily moved by the actuator 34 in the radial direction of the medium 2. While the embodiment moves the entire head 1 to shift the beam in the radial direction of the medium 2, only the lens actuator 13 carrying the lens 14 and the lens position detector 15 may be moved by the head actuator 34, i.e., the laser 11, beam splitter 12 and track error detector 16 may be affixed to the base of a disk drive.

Circuitry for driving the head 1 and lens 14 as stated above is as follows. Two current signals generated by the track error detector 16 are applied to a track error amplifier 22. In response, the track error amplifier 22 determines a difference between the two inputs and amplifies the difference to thereby produce a corresponding track error signal j. Receiving the track error signal j, a track pulse generating circuit 23 detects zero-crossing of the signal j and outputs a track pulse b indicating that the beam has traversed a track. A speed detecting circuit 24 receives the track pulses b and comprises, for example, a frequency-to-voltage (F/V) converting circuit. The speed detecting circuit 24 generates a speed signal e indicative of the speed at which the beam traverses tracks. If desired, this circuit 24 may be so constructed as to enhance the frequency characteristic of the speed signal e by adding a current signal c representative of the drive current of the lens actuator 13 to the F/V converted signal, as taught in Japanese Patent Laid-Open Publication No. 7114/1979.

At the beginning of the movement of the head 1, a target displacement signal a indicative of the distance between the current position of the beam and the target track, i.e., the number of tracks to traverse is applied to a position error signal generator 25. Then, the position error signal generator 25 sequentially decrements the target displacement in response to the consecutive track pulses b while generating a position error signal f indicative of the distance between the beam in movement and the target track, i.e., the number of tracks left. On receiving the position error signal f, a reference speed signal generator 26 outputs a reference speed signal g for providing a moving speed of the beam. An error amplifier 27 amplifies a difference between the reference speed signal g and the speed signal e to produce a speed error signal h. The speed error signal h plays the role of a drive signal for causing the moving speed of the lens 14 to conform to the reference speed signal g, i.e., a signal for driving the lens 14 in the radial direction of the medium 2 to access the tracks. A selector 28 usually selects the speed error signal h and delivers it to a power amplifier 29. The power amplifier 29 feeds a current proportional to the speed error signal h to the lens actuator 13. As a result, the lens actuator 13 generates an acceleration proportional to the input current to thereby drive the lens 14 toward the target track.

On the other hand, the lens position detector 15 generates a signal which changes when the position of the lens 14 is deviated. A lens position amplifier 21 amplifies this signal to produce a corresponding lens position signal k. A phase correcting circuit 32 corrects the phase of the lens position signal k and then feeds it to a power amplifier 33. The power amplifier 33 amplifies the input and applies a current proportional to the amplifies input to the head actuator 34. The head actuator 34 generates an acceleration proportional to the input current so as to cause the head 1 to follow the movement of the lens 14. This kind of scheme, i.e., driving an optical head on the basis of a lens position signal to cause it to follow the movement of a converging lens is also described in detail in previously stated Japanese Patent Laid-Open Publication No. 131646/1985.

So long as the movement of the lens 14 remains in the range of ability of the head actuator 34 for driving the head 1 (i.e. within the limits of speed and acceleration which can be generated), the head 1 follows the lens 14 with high accuracy. However, once the lens 14 is accelerated or decelerated beyond the following ability of the head actuator 34, the position of the lens 14 is noticeably deviated. Since the lens 14 is far lighter than the head 1 and easy to accelerate and decelerate, the noticeable deviation of the lens 14 readily occurs unless the movement of the lens 14 is regulated. In the light of this, the illustrative embodiment further includes a level comparing circuit 31 for monitoring the level of the lens position signal k. Briefly, when the positional deviation of the lens 14 increases beyond a predetermined range, the level comparing circuit 31 replaces the speed error signal h to be applied to the power amplifier 29 with a signal produced by differentiating the lens position signal k. This is successful in preventing the lens 14 from being moved beyond the following ability of the head actuator 34.

Specifically, the level comparing circuit 31 is implemented as a comparator responsive to an occurrence that the lens position signal k exceeds a predetermined positive or negative level. When the lens position signal k exceeds the range defined by the predetermined positive and negative levels, the level comparing circuit 31 causes the selector 28 to select the output signal of a differentiator 30 in place of the usual speed error signal h. The differentiator 30 differentiates the lens position signal k to produce a signal indicative of a variation of the signal k, i.e., a speed of the lens 14 relative to the head 1. As the output signal m of the differentiator 30 is applied to the power amplifier 29 via the selector 28 to drive the lens actuator 13, the relative speed of the lens 14 to the head 1 is fed back to the movement of the lens 14. At this instant, the speed of the lens 14 is controlled to be equal to that of the head 1.

More specifically, when the lens position signal k exceeds the predetermined positive or negative level as determined by the level comparing circuit 31, further acceleration or deceleration of the lens 14 is stopped. Then, the control for equalizing the speed of the lens 14 and that of the head 1 relative to each other is executed. As a result, the positional deviation of the lens 14 and head 1 is prevented from increasing to a critical degree. Here, what is controlled is the relative speed of the lens 14 and head 1 and not the position of the lens 14 relative to the head 1. Hence, the lens position signal k does not sharply returns to zero, i.e., it remains above the positive threshold or below the negative threshold over a certain period of time (0.1 millisecond to 1 millisecond).

During this period of time, the input to the power amplifier 33 substantially saturates with the result that the head actuator 34 accelerates the head 1 with the maximum force thereof. Of course, the lens 14 is accelerated at the same acceleration as the head 1 to maintain the same relative speed to the head 1. Consequently, while the speed of the lens 14 is regulated, the head 1 is accelerated at substantially the maximum acceleration available with the head actuator 34. The speed regulation, therefore, does not increase the access time of the beam.

When the lens position signal k returns to the allowable range, the selector 28 again selects the speed error signal h to resume the usual speed control mode. In this mode, the movement of the lens 14 conforms to the reference speed signal g.

By the above procedure, the embodiment controls the movement of the lens 14 in the radial direction of the medium 2 while preventing the deviation of the lens 14 and head 1 from increasing excessively.

Figures 2A, 2B, 2C, 2D:
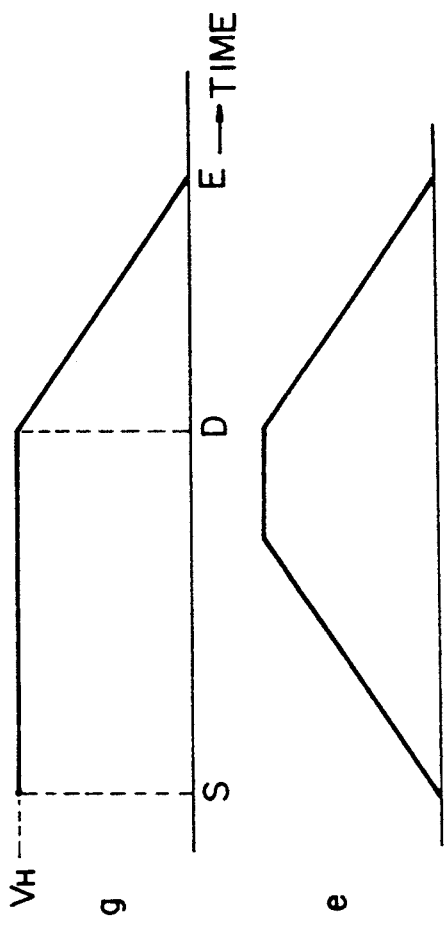
FIGS. 2A-2D show specific waveforms of signals appearing in essential part of the circuitry of FIG. 1.

The operation of the embodiment will be described more specifically with reference to FIGS. 2A–2D. As shown in FIG. 2A, at the beginning S of the movement of the beam, the reference speed signal g indicates the maximum speed $V_H$ since the position error signal f has a great value. At a time D when the beam reaches a predetermined distance to a target track, a deceleration begins. Thereafter, the reference speed signal g sequentially decreases and reaches zero at a time E associated with the target track. The lens 14 is capable of responding extremely rapidly. Hence, on receiving the reference speed signal g of maximum speed level $V_H$ at the beginning S, the lens 14 starts moving at a high deceleration so as to reach such a speed rapidly. However, since the head 1 cannot follow the rapid movement of the lens 14, the deviation of the lens 14 is increased with the result that the lens position signal k sharply increases, as shown in FIG. 2C. As the lens position signal k exceeds a positive slice level +Vs set by the level comparing circuit 31, the selector 28 selects the output signal m of the differentiator 30 and feeds it to the power amplifier 29. Hence, as shown in FIG. 2D, although the current c fed to the lens actuator 13 sharply increases at the beginning S, it decreases to the negative side when the lens position signal k exceeds the slice level +Vs to thereby decelerate the lens 14 to a speed matching the speed of the head 1.

As the speed of the lens 14 and that of the head 1 become substantially equal, a current for acceleration (positive) is applied to the lens actuator 13 to cause the lens 14 to follow the acceleration of the head 1. When the deviation of the lens 14 and head 1 further decreases to return the lens position signal k to below the slice level +Vs, the selector 28 again selects the speed error signal h. As a result, the lens 14 is again accelerated to conform to the reference speed signal g. At this instant, although the current to the lens actuator 13 sharply rises, deceleration (speed regulation) is again effected at the time when the lens position signal k exceeds the predetermined value.

By repeating the above procedure, the embodiment suppresses the mean acceleration of the lens 14 to below the limit which the head 1 can follow. Specifically, as shown in FIG. 2B, the lens speed slowly rises with an almost constant gradient or acceleration. The deviation of the lens 14 may also increase at the time of deceleration D since it responds to the sharp increase of the reference speed signal g. Then, as the signal k exceeds a negative slice level −Vs, the selector 28 will be operated to match the speed of the lens 14 and that of the head 1 in the above-described manner.

The operation described above is successful to maintain the movement of the lens 14 in the range which the head 1 can follow.

It is to be noted that the control for regulating the movement (speed) of the lens 14 is implemented by a speed control loop which feeds back the differentiated version of the lens position signal k. This is practicable with a first-order system which promotes a stable operation with a minimum of oscillation, compared to a second-order system which will directly feed back the lens position signal k.

In summary, in accordance with the present invention, when the positional deviation of a converging lens exceeds a predetermined range, a signal produced by differentiating a lens position signal is used to drive the lens. This prevents the lens from moving at excessive speeds or excessive accelerations and, therefore, stabilizes track access control which drives the lens to move a beam while causing an optical head to follow the movement of the lens. Hence, it is possible to increase the movement of the lens almost to a limit which the head can follow while regulating the movement of the lens relative to the head, thereby implementing rapid and stable track access control.

Various modifications will become possible for those skilled in the art after receiving the teachings of the present disclosure without departing from the scope thereof.

What is claimed is:

1. A track access control device for an optical disk drive which comprises a converging lens, an optical head for issuing a laser beam toward a medium via said converging lens to write or read data in or out of said medium, a lens driving circuit for generating a lens drive signal which moves said converging lens in a radial direction of said medium, a lens actuator responsive to said lens drive signal for moving said converging lens, lens position detecting means for generating a lens position signal representative of a position of said converging lens relative to said optical head, and head driving means responsive to said lens position signal for causing said optical head to follow a movement of said converging lens in such a manner as to reduce a positional deviation of said converging lens, said track access control device comprising:

signal level comparing means for comparing a level of the lens position signal with a predetermined reference level to produce a comparison signal;

a differentiating circuit for differentiating the lens position signal to produce a differentiation signal; and signal selecting means responsive to the comparison signal for feeding, when the positional deviation of the converging lens exceeds a predetermined range, the differentiation signal to the lens actuator in place of the lens drive signal.

2. A device as claimed in claim 1, wherein said signal level comparing means comprises a comparator for detecting an occurrence that the lens position signal has exceeded either of a positive and a negative slice level.

* * * * *